(12) United States Patent
Statz

(10) Patent No.: US 8,613,475 B1
(45) Date of Patent: Dec. 24, 2013

(54) DEPLOYABLE TRUCK BED GRAB BAR

(71) Applicant: William A. Statz, Cross Plains, WI (US)

(72) Inventor: William A. Statz, Cross Plains, WI (US)

(73) Assignee: DoMore Truck Company, LLC, Hartford, WI (US)

( * ) Notice: Subject to any disclaimer, the term of this patent is extended or adjusted under 35 U.S.C. 154(b) by 0 days.

(21) Appl. No.: 13/749,908

(22) Filed: Jan. 25, 2013

(51) Int. Cl.
*B60J 9/00* (2006.01)

(52) U.S. Cl.
USPC .......................... 296/1.02; 296/57.1; 296/62

(58) Field of Classification Search
USPC .......................... 296/1.02, 57.1, 62, 224, 280
See application file for complete search history.

(56) References Cited

U.S. PATENT DOCUMENTS

| | | |
|---|---|---|
| 6,340,189 B1 | 1/2002 | Pordy |
| 6,799,353 B1 | 10/2004 | Stewart |
| 7,090,276 B1 | 8/2006 | Bruford et al. |
| 7,530,619 B1 | 5/2009 | Bruford et al. |
| 8,251,423 B1 | 8/2012 | Lingle |
| 2011/0168491 A1 | 7/2011 | Cheatham, Jr. |

*Primary Examiner* — Joseph Pape
*Assistant Examiner* — Dana Ivey
(74) *Attorney, Agent, or Firm* — Reinhart Boerner Van Deuren s.c.

(57) ABSTRACT

A device for assisting access to motor vehicles having a grip handle moveable between at least one stored position and a deployed position for assisting a user to climb up onto the tailgate and bed of a pickup truck is disclosed. A handle arm having the grip handle at one end thereof is pivotally mounted at the other end thereof onto a mounting bracket which itself is installed at the rear and on one side of a pickup truck bed. The handle arm is pivotally moveable between a deployed position extending rearwardly over the tailgate of the pickup truck and at least one stored position within the bed of the pickup truck.

19 Claims, 12 Drawing Sheets

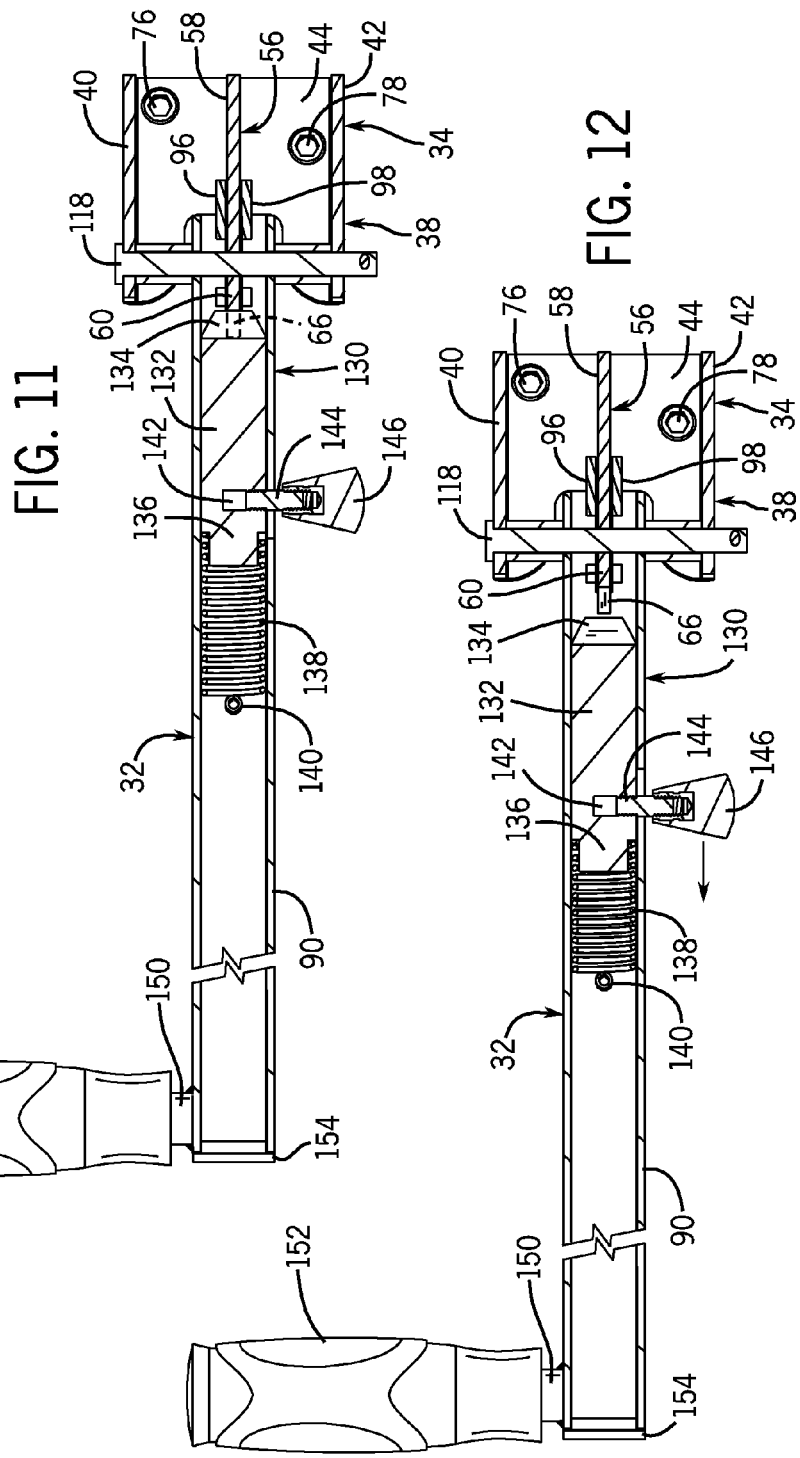

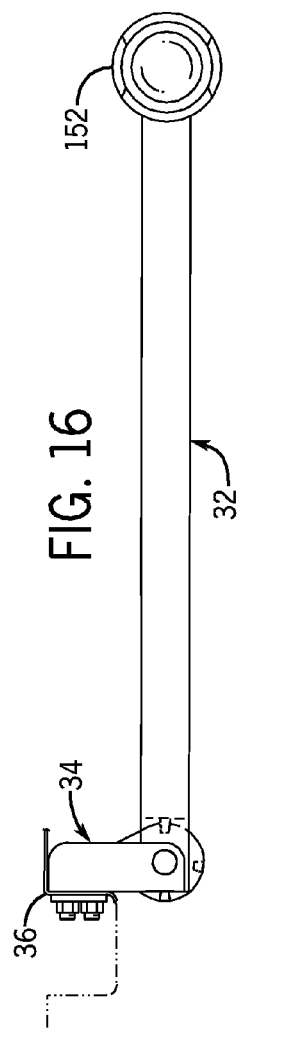
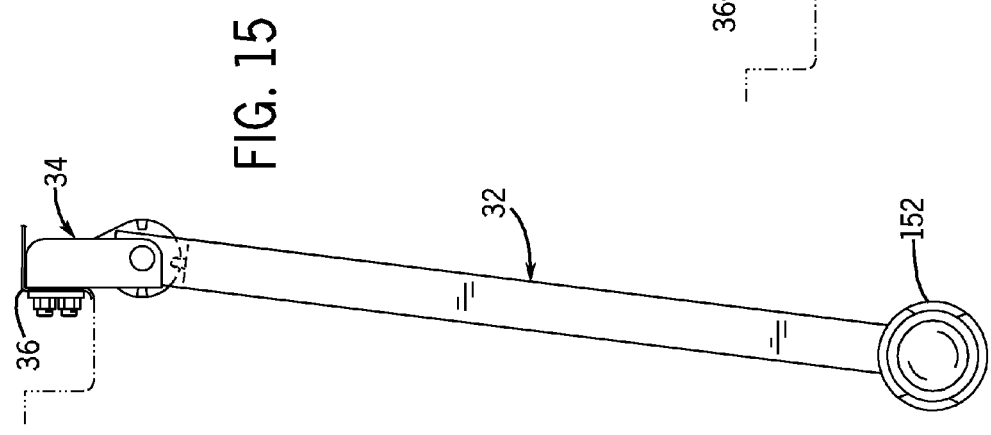

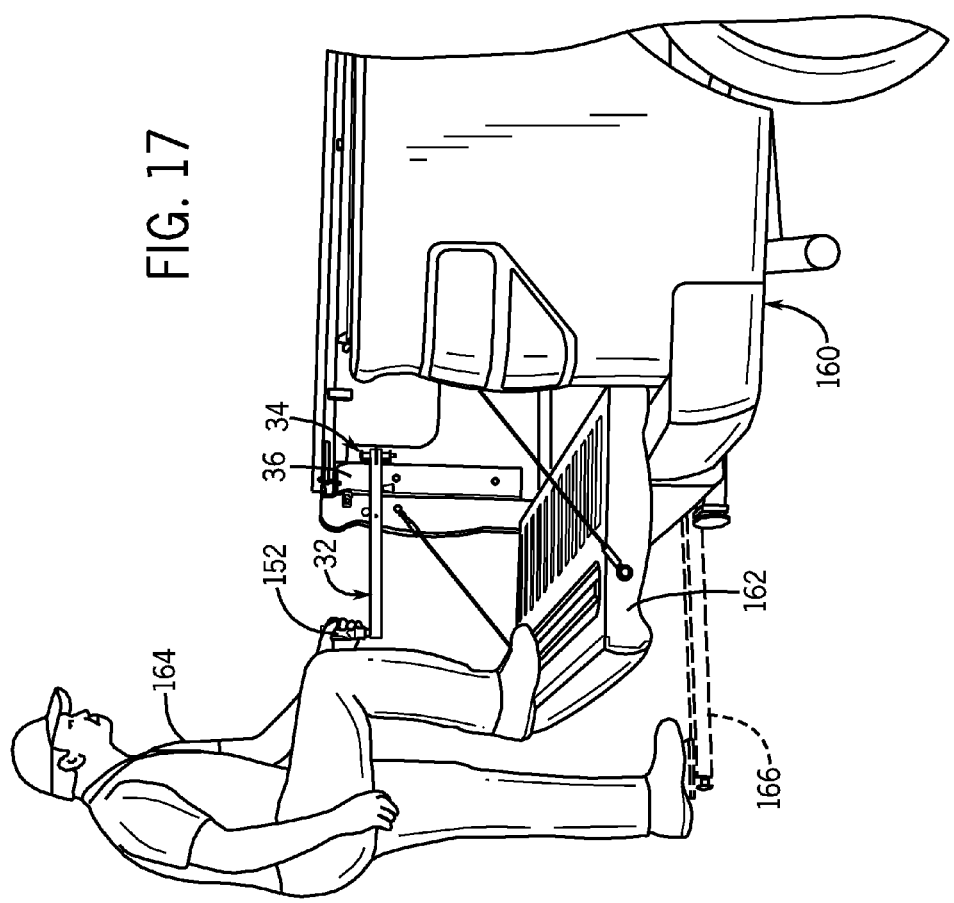

DEPLOYABLE TRUCK BED GRAB BAR

BACKGROUND OF THE INVENTION

Field of the Invention

The present invention relates generally to devices for assisting access to motor vehicles, and more particularly to a grip handle moveable between at least one stored position and a deployed position for assisting a user to climb up onto the tailgate and bed of a pickup truck.

Pickup trucks have become an increasingly popular choice as the motor vehicle due in part to their versatility in hauling a variety of items in their beds, primary access to which is gained by lowering a tailgate at the rear of the pickup truck bed. Since pickup truck tailgates typically have a higher ground clearance than cars, and since pickup truck tailgates are located above the rear bumper of the pickup truck, they are located well off the ground. For many individuals it is difficult to climb up onto the tailgate and the pickup truck bed since there is no convenient handle or other support to assist individuals in retaining their balance as they climb up.

As may be expected, there have been attempts to provide such support. For example, see U.S. Pat. No. 8,251,423, to Lingle, which teaches a truck bed handle assembly that may be mounted at the rear of a sidewall of a truck bed. The Lingle truck bed handle assembly has a handle with two positions, one of which is a lowered stored position in which the handle is located adjacent to the sidewall of the pickup truck bed, and the other of which is a vertical position at the rear of the sidewall of the truck bed. Unfortunately, since most users climbing up onto the tailgate of a truck to gain access to the truck bed choose to do so from the rear of the tailgate rather than at the rear of the sidewall (presumably in order to avoid falling), the Lingle truck bed handle assembly is not desirable from an ergonomic standpoint, since it is awkwardly located and its grip is too high.

Other approaches include U.S. Pat. Nos. 7,090,276 and 7,530,619, both to Bruford et al., which teach a pivotable grab handle that also has two positions, one of which is a stowed position within a cavity located in the truck's tailgate, and the other of which is a deployed position extending upwardly above the lowered tailgate. Unfortunately, the Bruford et al. devices are designed as OEM installations which are contained inside the tailgate of the truck, which is understandable considering that they are assigned to Ford Motor Company.

Yet another approach is shown in U.S. Patent Application Publication No. 2011/0168491, to Cheatham, Jr., which teaches a ladder mountable onto the inside of a tailgate and deployable to the ground when the tailgate is lowered. At the top of the ladder and at the rear corner of the tailgate is a slidable bar that may be deployed in a vertical position. Both the slidable bar and the ladder may be folded over the tailgate and into the truck bed, and then rotated to bring both into the inside of the tailgate, after which the tailgate may be closed. Aside from the fact that the Cheatham, Jr. device is both expensive to build and clumsy to deploy and store, its handle is located too high to assist a user located on the ground.

It will thus be appreciated that it would be desirable to provide a system and method to better assist a user to climb up onto the tailgate and bed of a pickup truck. It would also be desirable for the system and method to provide a grip handle in an ergonomically superior location above and near the rear end of the tailgate of the pickup truck to better assist a user to climb up onto the tailgate and bed of a pickup truck. It would additionally be desirable for the system and method to optionally provide a grip handle that can be stored in a plurality of positions rather than in only a single position. It would further be desirable for the system and method to provide a grip handle that may be installed on any pickup truck as an aftermarket product rather than requiring it to have been built into the pickup truck at the time of its manufacture.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The disadvantages and limitations of the background art discussed above are overcome by the present invention. With this invention, a truck bed grab bar is provided that may be mounted on any pickup truck at the rear and on one sidewall of the bed of the pickup truck, just below the top edge of the sidewall. The truck bed grab bar has a mounting bracket that may be secured to a vertical support member on the sidewall at the rear of the pickup truck bed at a level just below the top edge of the sidewall. A handle arm is pivotally mounted onto the mounting bracket for pivoting movement in an essentially horizontal plane between at least two, and optionally three, positions.

In a first deployed position, the handle arm extends rearwardly over the tailgate at the side of the tailgate (the side of the tailgate being on the same side of the pickup truck on which the mounting bracket is mounted). The handle arm has a handle grip extending upwardly from the end opposite the mounting bracket. By grasping this handle grip, a user may easily climb up onto the tailgate from a position on the ground behind the tailgate and then into the bed of the pickup truck.

In an embodiment where the handle arm has second and third stored positions, one of the stored positions (the second stored position) is located so that the end of the handle arm including the handle grip is located close adjacent the inside of the tailgate of the pickup truck when it is in its closed position. In this embodiment, the other of the stored positions (the second stored position) is located so that the handle arm is close adjacent the sidewall of the pickup truck on which the mounting bracket is installed. Alternatively, only one of these stored positions could be used in a single stored position embodiment.

The truck bed grab bar has a latching mechanism that allows the handle arm to be locked in either the first deployed position, the second stored position, or the third stored position (in the embodiment having two stored positions). Alternatively, in the embodiment having only a single stored position, the latching mechanism would allow the handle arm to be locked in either the first deployed position of the single stored position. The latching mechanism includes a biasing mechanism that biases the latching mechanism into a locked position, with the latching mechanism being moveable by a user to unlock it.

In a first exemplary implementation of the present invention, a deployable grab handle comprises: a mounting bracket that is arranged and configured for mounting to a sidewall of the pickup truck bed near a rear end thereof; a handle arm that is arranged and configured for pivotable mounting at a first end thereof onto the mounting bracket such that the handle arm pivots in a horizontal plane between a deployed position extending to the rear of the truck over the tailgate when the tailgate is in an open position and at least one stowed position in a space defined within the bed of the pickup truck when the tailgate is in a closed position; a handle grip located at a second end of the handle arm opposite the first end thereof; and a latching mechanism that is arranged and configured to releasably lock the handle arm in either the deployed position or in the at least one stowed position.

In a second exemplary implementation of the present invention, a deployable grab handle comprises: a mounting bracket that is arranged and configured for mounting to one of the sidewalls of the pickup truck bed near a rear end thereof; a latch plate located on the mounting bracket, the latch plate having first, second, and third notches located therein; a handle arm that is arranged and configured for pivotable mounting at a first end thereof onto the mounting bracket such that the handle arm pivots in a horizontal plane between a first deployed position extending to the rear of the truck over the tailgate when the tailgate is in an open position, a second stored position in which the second end of the handle arm is located close adjacent the inside of the tailgate when the tailgate is in its closed position, and a third stowed position in which handle arm is close adjacent the sidewall of the pickup truck on which the mounting bracket is installed; a handle grip located at a second end of the handle arm opposite the first end thereof; and a latch member located in the handle arm and moveable between latched and unlatched positions, the latch member being arranged and configured for latching engagement with any of the first, second, or third notches in the latch plate; wherein the latch member releasably locks the handle arm in the first deployed position when it engages the first notch in the latch plate; and wherein the latch member releasably locks the handle arm in the second stored position when it engages the second notch in the latch plate; and wherein the latch member releasably locks the handle arm in the third stored position when it engages the third notch in the latch plate.

In a third exemplary implementation of the present invention, a deployable grab handle comprises: a mounting bracket that is arranged and configured for mounting to a sidewall of a pickup truck bed near a rear end thereof; and a handle arm that is arranged and configured for pivotable mounting on the mounting bracket such that the handle arm moves in a horizontal plane between a deployed position extending to the rear of the truck over the tailgate and at least one stowed position within the bed of the pickup truck.

In a method for facilitating an individual to climb onto a tailgate of a pickup truck having a bed with sidewalls, the steps of: providing a mounting bracket that is arranged and configured for mounting to a sidewall of the pickup truck bed near a rear end thereof; mounting a handle arm at a first end thereof onto the mounting bracket for pivotable movement in a horizontal plane between a deployed position extending to the rear of the truck over the tailgate and at least one stowed position within the bed of the pickup truck, the handle arm having a handle grip located at a second end thereof opposite the first end thereof; and releasably locking the handle arm in either the deployed position or in the at least one stowed position.

The truck bed grab bar of the present invention provides a system and method to better assist a user to climb up onto the tailgate and bed of a pickup truck. The truck bed grab bar system and method of the present invention provides a grip handle in an ergonomically superior location above and near the rear end of the tailgate of the pickup truck to better assist a user to climb up onto the tailgate and bed of a pickup truck. The truck bed grab bar system and method of the present invention optionally provides a grip handle that can be stored in a plurality of positions rather than in only a single position. The truck bed grab bar system and method of the present invention provides a grip handle that may be installed on any pickup truck as an after-market product rather than requiring it to have been built into the pickup truck at the time of its manufacture. Finally, the truck bed grab bar of the present invention achieves numerous advantages without incurring any substantial relative disadvantage.

DESCRIPTION OF THE DRAWINGS

These and other advantages of the present invention are best understood with reference to the drawings, in which:

FIG. 11 is a cross-sectional side view of the assembled components of the truck bed grab bar shown in FIGS. 3 through 10, showing the operation of the latching mechanism used to adjust the position of the handle arm relative to the mounting bracket in a locked position;

FIG. 12 is a cross-sectional side view of the truck bed grab bar similar to the view of FIG. 11, but with the latching mechanism used to adjust the position of the handle arm relative to the mounting bracket in an unlocked position;

FIG. 15 is a top plan view similar to the view of FIG. 14, showing a second stored position of the handle arm relative to the mounting bracket;

FIG. 16 is a top plan view similar to the views of FIGS. 14 and 15, showing a third stored position of the handle arm relative to the mounting bracket;

FIG. 17 is an isometric view of the truck bed grab bar of the present invention mounted in the bed of a pickup truck, showing the handle arm in the first deployed position over the open tailgate of a pickup truck to assisting an individual to climb into the bed of the pickup truck;

DETAILED DESCRIPTION OF AN EXEMPLARY EMBODIMENT

Figure 1:
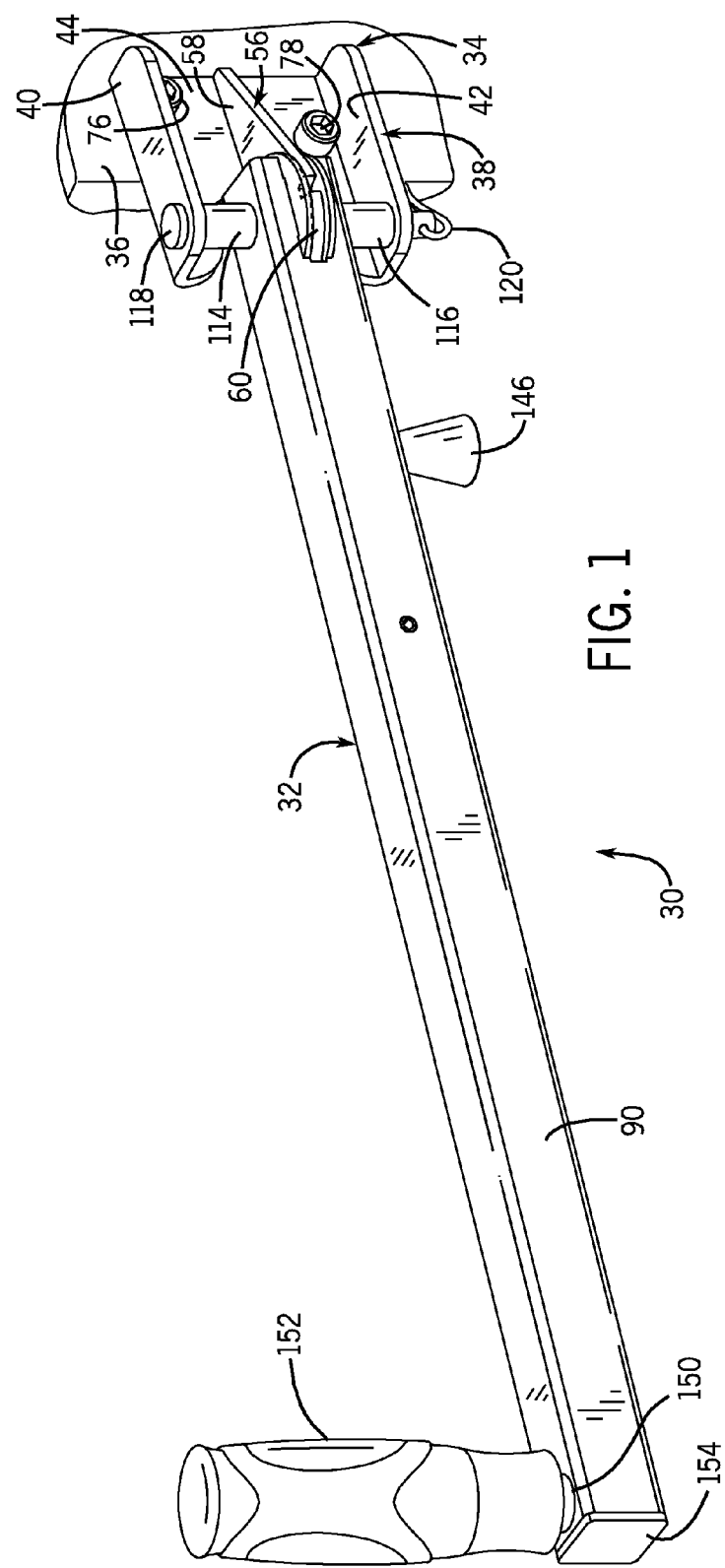
FIG. 1 is an isometric view showing an exemplary truck bed grab bar constructed according to the teachings of the present invention
Figure 2:
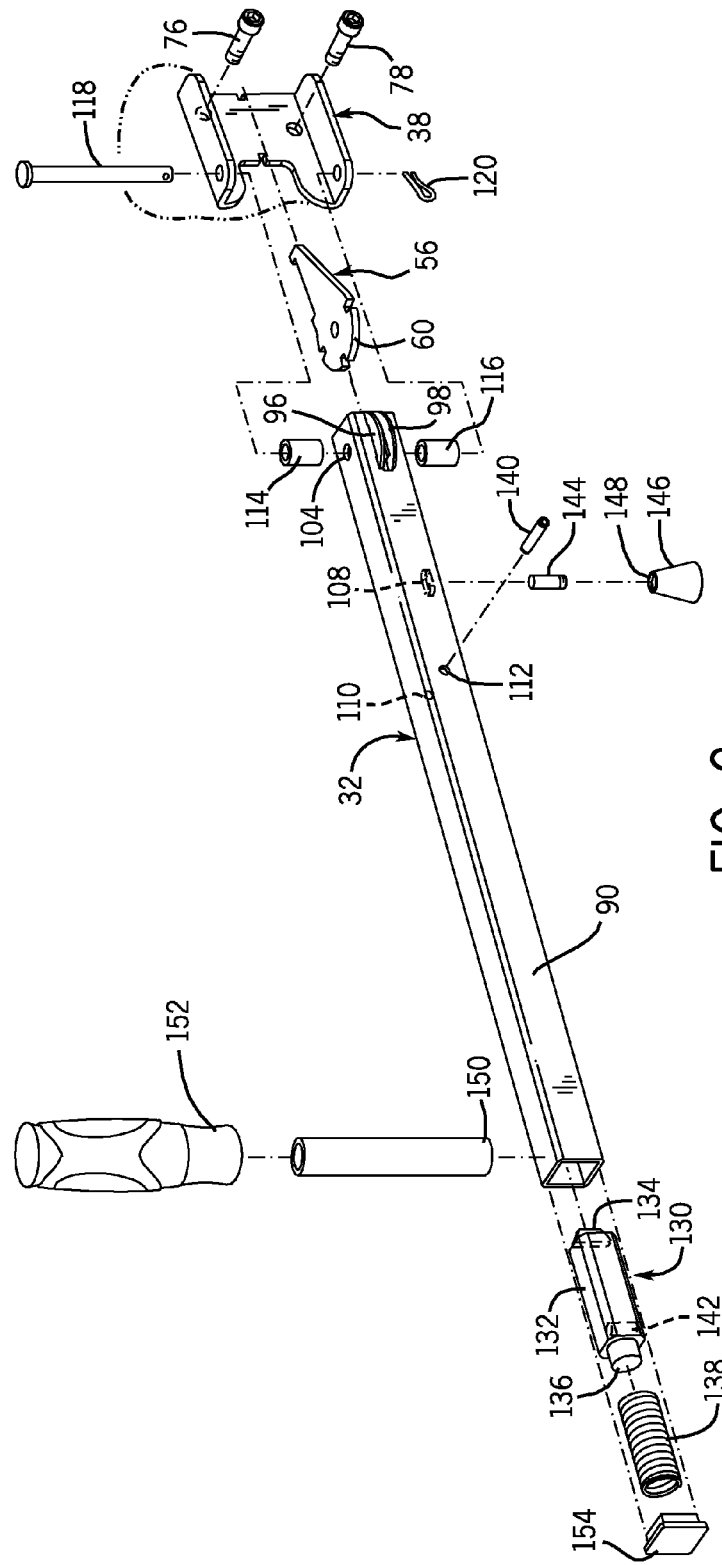
FIG. 2 is an exploded isometric view showing the various components of the truck bed grab bar illustrated in FIG. 1.

An exemplary embodiment of the truck bed grab bar system and method of the present invention is shown in the accompanying drawings, with FIG. 1 showing an assembled truck bed grab bar 30 and FIG. 2 showing the various components of the assembled truck bed grab bar 30 in exploded positions. Referring to both FIG. 1 and FIG. 2, it may be seen that a handle arm 32 is pivotally mounted on a mounting bracket 34 which is in turn mounted onto a vertical support member 36 which is located at the rear and on one side of a pickup truck bed (shown in part in FIG. 1).

Figure 3:
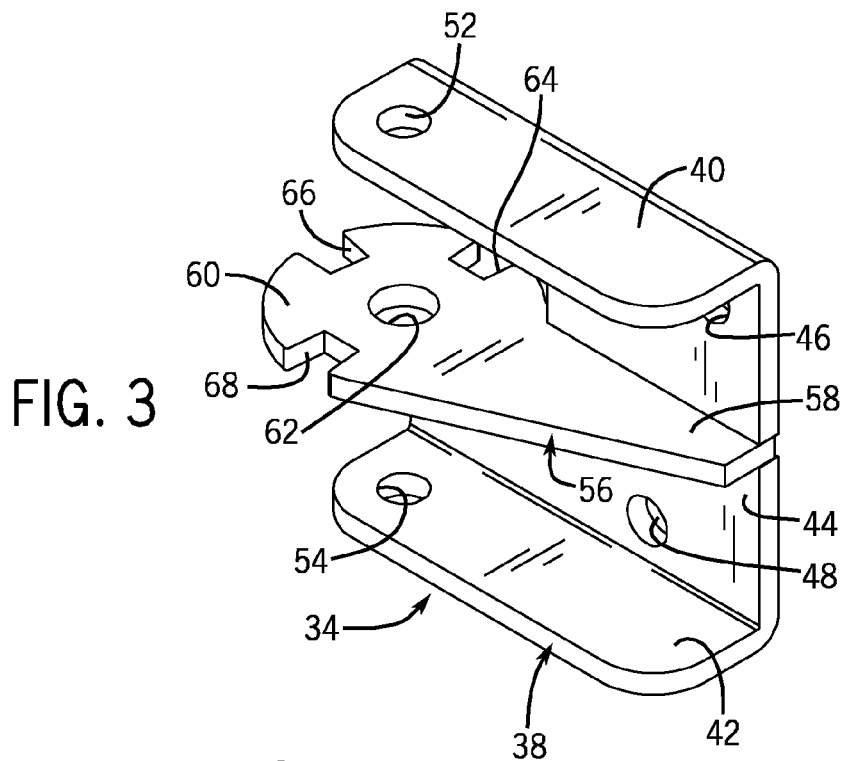
FIG. 3 is an enlarged isometric view of the mounting bracket used to mount the truck bed grab bar onto the pickup truck shown with the various other components of the truck bed grab bar in FIGS. 1 and 2.
Figure 4:
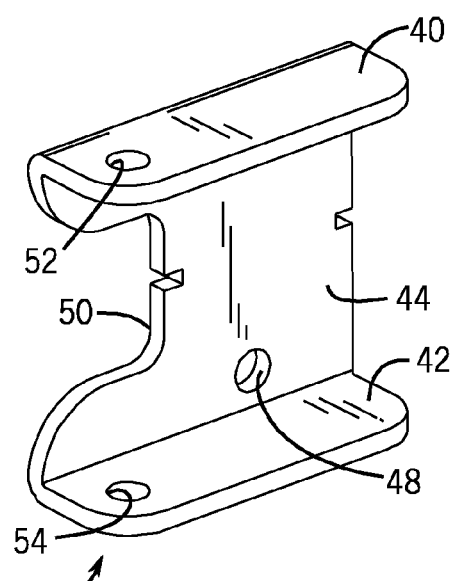
FIG. 4 is an isometric view of the U-shaped latch plate support bracket of the mounting bracket illustrated in FIG. 3.

The mounting bracket 34, the components of which are best shown in FIGS. 2, 3, and 4, consists of a U-shaped latch plate support bracket 38 having parallel upper and lower flanges 40 and 42 extending orthogonally from the top and bottom sides, respectively, of a support plate 44. The support plate 44 has a pair of apertures 46 and 48 that will be used to facilitate the mounting of the mounting bracket 34 onto the vertical support member 36 (shown in FIG. 1). The left side of the support plate 44 is notched inwardly as indicated generally by the reference numeral the inward notch 50. Apertures 52 and 54 are respectively located in the upper and lower flanges 40 and 42 near the ends thereof adjacent the inward notch 50 in the support plate 44.

Figure 5:
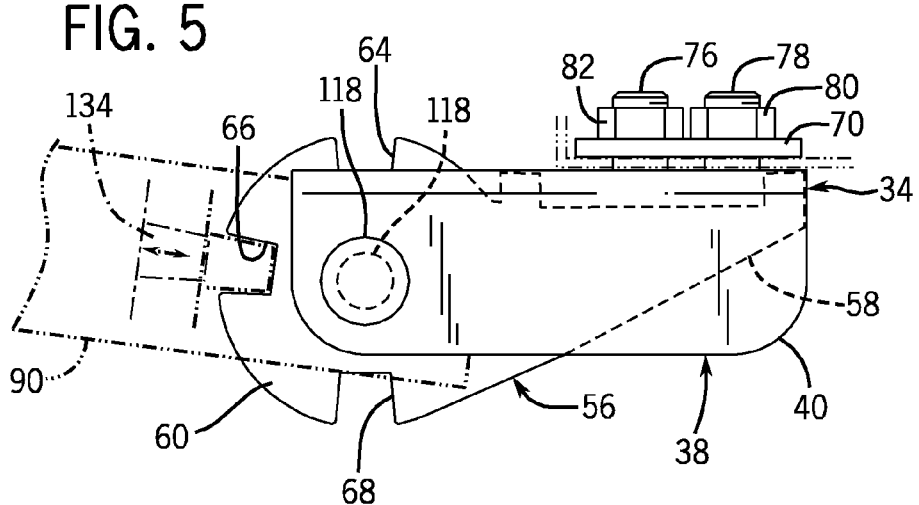
FIG. 5 is a top plan view of the mounting bracket illustrated in FIG. 3, showing three notches in the latch plate that is mounted in the latch plate support bracket illustrated in FIG. 4.

Referring for the moment to FIGS. 3 and 5, a latch plate 56 is shown installed on the interior of the "U" of the latch plate support bracket 38, midway between the upper and lower flanges 40 and 42. The right side 58 of the latch plate 56 is attached to the latch plate support bracket 38, with both pieces preferably being made of steel and being welded together. Optionally, the right side 58 of the latch plate 56 may have two small tabs extending from the rear side thereof which extend into two corresponding small notches located in opposite sides of the support plate 44 of the latch plate support bracket 38, which facilitate the placement of the latch plate 56 intermediate the upper and lower flanges 40 and 42 of the latch plate support bracket 38.

The left side of the latch plate 56 is a partial circular segment 60 having a centrally-located aperture 62 therein which is coaxial with an axis extending through the apertures 52 and 54 in the upper and lower flanges 40 and 42 of the latch plate support bracket 38. Three notches 64, 66, and 68 are located in the outer perimeter of the circular segment 60 of the latch plate 56, with the first notch 64 facing approximately opposite the "U" of the latch plate support bracket 38, and the third notch 68 located approximately 175-180 degrees from the first notch 64. The second notch 66 is oriented away from the right side 58 of the latch plate 56, approximately 83 degrees from the first notch 64.

Figure 10:
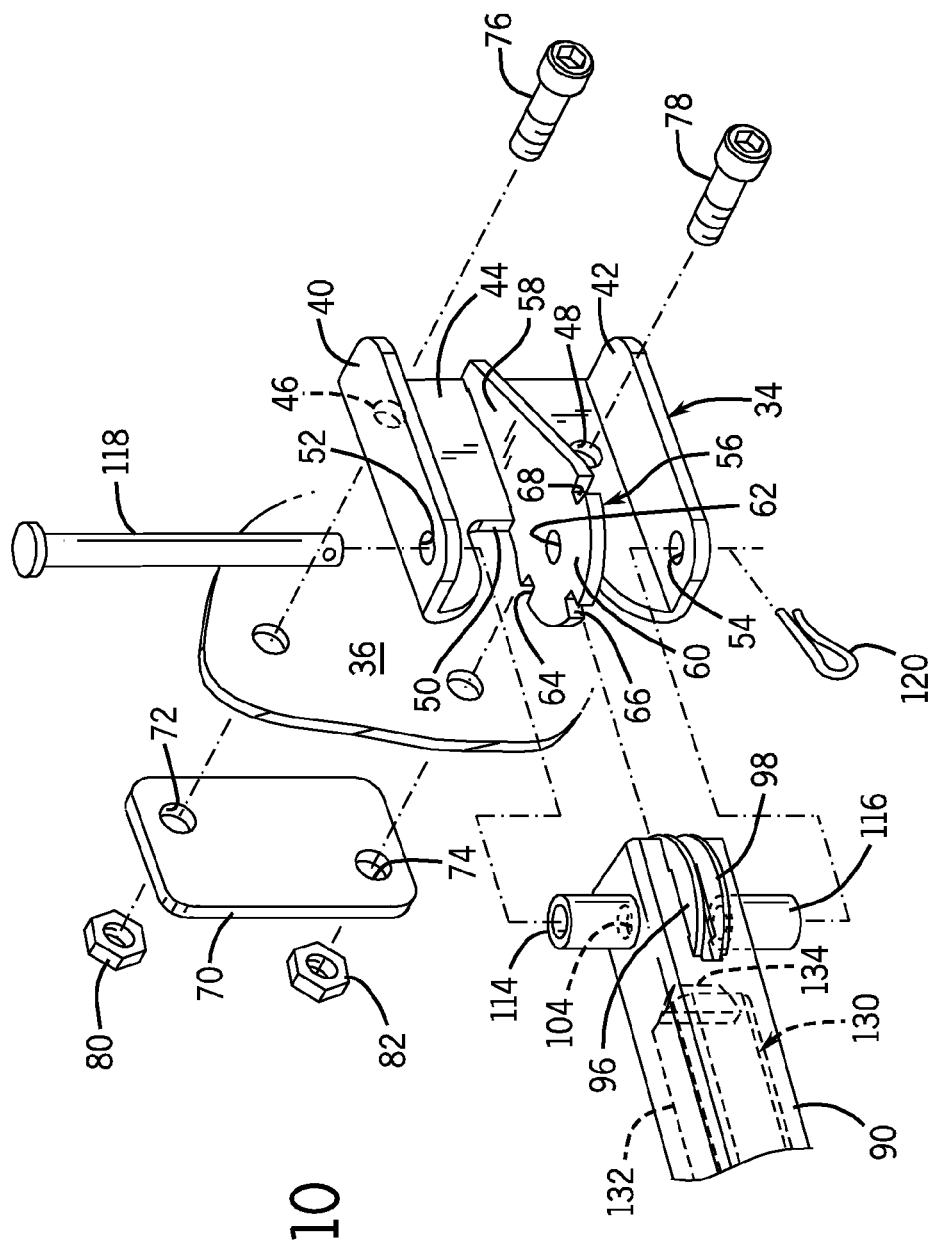
FIG. 10 is an exploded isometric view showing the assembly of the handle arm shown in FIGS. 6 through 9 to the mounting bracket illustrated in FIGS. 3 through 5.

Referring to FIGS. 1, 5, and 10, the mounting bracket 34 will be mounted onto the vertical support member 36 using a nut plate 70 having two apertures 72 and 74 located therein which is located on the opposite side of the vertical support member 36 from the mounting bracket 34, which are aligned with the apertures 46 and 48 in the support plate 44 of the latch plate support bracket 38. A pair of bolts 76 and 78 and a pair of nuts 80 and 82 are used to mount the latch plate support bracket 38 onto the vertical support member 36 using the nut plate 70 to provide for a large surface area for anchoring the assembled truck bed grab bar 30 to a pickup truck bed to be able to handle a large torque force of the truck bed grab bar while it is in use. Different nut plates may be provided for use with different pickup trucks. Optionally, instead of using the nuts 80 and 82, the apertures 72 and 74 in the nut plate 70 may be threaded with the bolts 76 and 78 being screwed into the threaded apertures.

Figure 7:
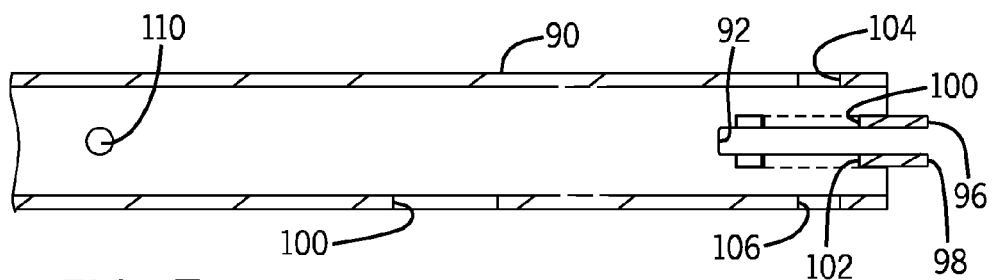
FIG. 7 is a cross-sectional view of a portion of a grab bar tube of the handle arm illustrated in FIG. 6 in a vertical plane showing the locations of two circular latch guard plates around a horizontal slot in the grab bar tube.
Figure 8:
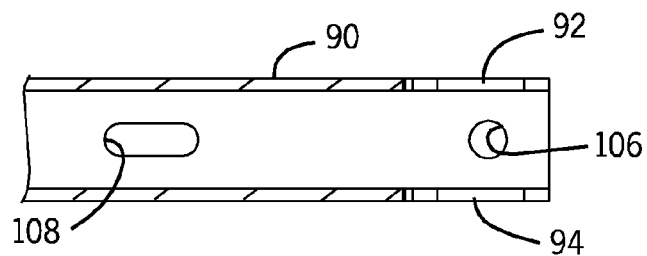
FIG. 8 is a cross-sectional view of a portion of the grab bar tube of the handle arm illustrated in FIGS. 6 and 7 in a horizontal plane showing optional vertical notches located in each of the horizontal slots.
Figure 9:
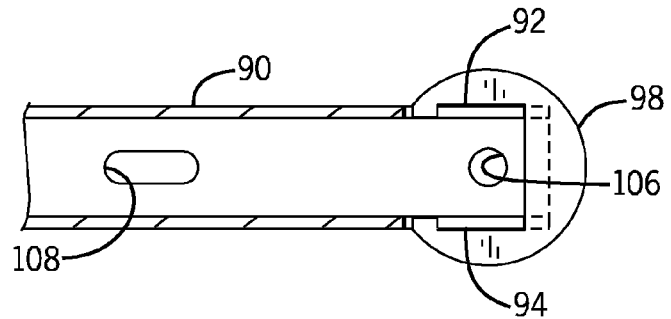
FIG. 9 is a cross-sectional view of a portion of the grab bar tube of the handle arm illustrated in FIGS. 6 through 8 in a horizontal plane showing one of the latch guard plates and also showing a longitudinal slot located in the bottom side of the grab bar tube.
Figure 6:
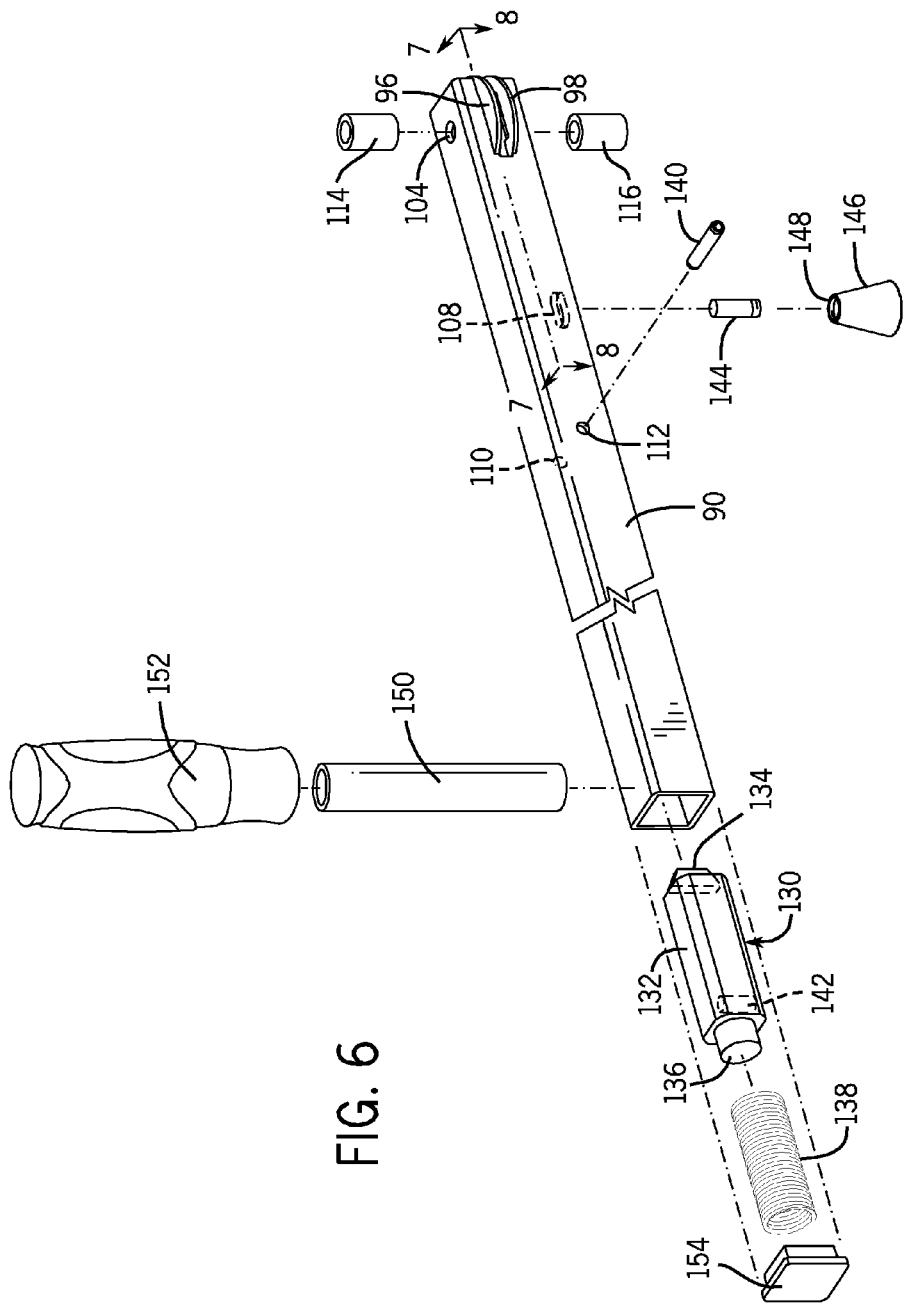
FIG. 6 is an exploded isometric view of the various components of the handle arm of the truck bed grab bar illustrated in FIGS. 1 and 2.

Referring now to FIGS. 6 through 8, the construction of the handle arm 32 is illustrated. The handle arm 32 is a segment of hollow square tubing 90 that is open at both ends. At the end of the handle arm 32 which will be pivotally attached to the latch plate support bracket 38 (best shown in FIGS. 1, 3, and 5) are two slots 92 and 94 located on opposite lateral sides of the handle arm 32. Each of the lateral slots 92 and 94 has a notch located at each end thereof. The square tubing 90 may be made of steel.

Located in those lateral slots 92 and 94 of the square tubing 90 are two spaced-apart flat notched circular segments 96 and 98, respectively. The notched circular segments 96 and 98 are flat and have generally rectangular notches 100 and 102, respectively, removed therefrom to enable them to fit around the lateral sides of the square tubing 90 immediately above and below the slots 92 and 94. Optionally, the circular segments 96 and 98 may have tabs extending toward each other at the outer edges of the rectangular notches 100 and 102 that fit into two of the optional notches located at the ends of the slots 92 and 94 furthest from the end of the square tubing 90. The rectangular notches 100 and 102 in the circular segments 96 and 98, respectively, fit into two of the optional notches located at the ends of the slots 92 and 94 at the end of the square tubing 90.

The circular segments 96 and 98 may also be made of steel, and are preferably welded in place on the square tubing 90. When the circular segments 96 and 98 are so installed on the square tubing 90, they define an area therebetween which will admit the circular segment 60 of the latch plate 56 of the mounting bracket 34 (best shown in FIG. 3, with the components being shown assembled in FIG. 1). The spacing of the circular segments 96 and 98 is such as to allow them to rotate with respect to the circular segment 60 of the latch plate 56. The circular segments 96 and 98 act as guards to prevent an operator's fingers from being pinched in the notches 64, 66, and 68.

Respectively located on the top and bottom sides of the square tubing 90 are apertures 104 and 106, which will be used to facilitate the mounting of the square tubing 90 onto the mounting bracket 34. Located away from the end of the square tubing 90 upon which the circular segments 96 and 98 are located on the bottom side thereof is a longitudinal slot 108. Located still further from the end of the square tubing 90 upon which the circular segments 96 and 98 are located on the lateral sides thereof are two apertures 110 and 112.

Referring now to FIGS. 1 through 5 and 7, and particularly to FIG. 2, the assembly of the square tubing 90 to the latch plate support bracket 38 may be described. The circular segments 96 and 98 on the square tubing 90 are brought into engagement with the circular segment 60 of the latch plate 56 with the apertures 104 and 106 in the square tubing 90 aligned with the apertures 52, 62, and 54 in the latch plate support bracket 38. A hollow cylindrical boss 114 is welded orthogonally onto the top side of the square tubing 90 in axial alignment with the aperture 104 and will be located immediately below the upper flange 40 of the mounting bracket 34, and a hollow cylindrical boss 116 is welded orthogonally onto the bottom side of the square tubing 90 in axial alignment with the aperture 106 will be located immediately above the lower flange 42 of the mounting bracket 34. These welds provide structural strength to the mounting of the handle arm 32 on the mounting bracket 34.

A hinge pin 118 is inserted sequentially through the aperture 52 in the upper flange 40 of the mounting bracket 34, the boss 114, the aperture 104 in the top side of the square tubing 90, the aperture 106 in the bottom side of the square tubing 90, the boss 116, and the aperture 54 in the lower flange 42 of the mounting bracket 34. A spring pin 120 is inserted into an aperture at the distal end of the hinge pin 118 to secure the hinge pin 118 in this position. In this manner, the square tubing 90 is pivotally mounted on the mounting bracket 34 for movement in a horizontal plane. Alternately, the distal end of the hinge pin 118 may be threaded and a hex nut (not shown herein) with a nylon insert may be threaded onto the distal end of the hinge pin 118 in locking fashion.

Referring now principally to FIG. 6, a latch member 130 that will be slidably located inside the square tubing 90 is shown. The latch member 130 has an elongated square body 132 that fits within the square tubing 90 in a manner allowing the latch member 130 to slide longitudinally within the square tubing 90. Located at the end of the square body 132 that will be adjacent the circular segment 60 of the latch plate 56 is a tooth 134 that will engage whichever of the first notch 64, the second notch 66, or the third notch 68 that end of the square tubing 90 is aligned with. Located at the opposite end of the latch member 130 is a cylindrical projection 136 (which is optional).

The latch member 130 is inserted into the square tubing 90 until the tooth 134 of the latch member 130 is within the rectangular notched 100 and 102 of the notched circular segments 96 and 98, respectively, with the square body 132 being inhibited from moving any further by its contact with the rectangular notched 100 and 102. A spring 138 that fits over the cylindrical projection 136 on the latch member 130 is restrained in a somewhat compressed configuration by a pin 140 that fits through the apertures 110 and 112 in an interference fit.

The square body 132 has a threaded aperture 142 located in the bottom side thereof that is aligned with the longitudinal slot 108 in the square tubing 90, with one end of a threaded stud 144 being inserted through the longitudinal slot 108 and screwed into the threaded aperture 142 in the square body 132. A knob 146 having a threaded aperture 148 located therein is screwed onto the other end of the threaded stud 144. Thus, it may be appreciated that the knob 146 may be used to retract the latch member 130 into the square tubing 90, disengaging the tooth 134 of the latch member 130 from any one of the first notch 64, the second notch 66, or the third notch 68 in the circular segment 60 of the latch plate 56 with which the tooth 134 may have been engaged.

As best shown in FIGS. 2 and 6, completing the construction of the truck bed grab bar 30 is a grip handle tube 150 that is welded or otherwise attached onto the top side of the square tubing 90 at the end opposite the notched circular segments 96 and 98. The grip handle tube 150 may be approximately five inches long or longer. A rubber or plastic handle grip 152 is slidingly installed onto the grip handle tube 150 in a frictional fit, although it can also be secured with the aid of an adhesive if desired. The open end of the square tubing 90 may have a plastic square tube insert 154 placed therein to thereby close the open end of the square tubing 90.

Figure 13:
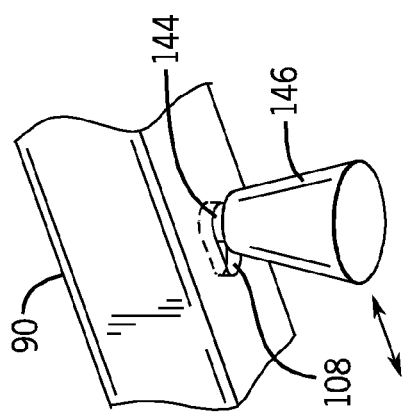
FIG. 13 is an enlarged view of the latch knob showing its movement between the locked position and the unlocked position.

Referring now to FIGS. 11 and 12, The operation of the latching system of the truck bed grab bar of the present invention is demonstrated. In FIG. 11, the latch member 130 is illustrated in its latched position. In this position, the tooth 134 on the square body 132 is urged into engagement with the second notch 66 of the circular segment 60 of the latch plate 56 (shown in detail in FIG. 5) by the spring 138. The latch member 130 may be moved from its latched position of FIG. 11 to its unlatched position of FIG. 12 by using the knob 146 to retract the latch member 130 against the force of the spring 138, as shown in the detail drawing of FIG. 13. By so doing, the tooth 134 on the square body 132 is retracted from the second notch 66 of the circular segment 60 of the latch plate 56 (or one of the other notches 64 and 68, depending upon the position of the handle arm 32 in the mounting bracket 34).

Figure 14:
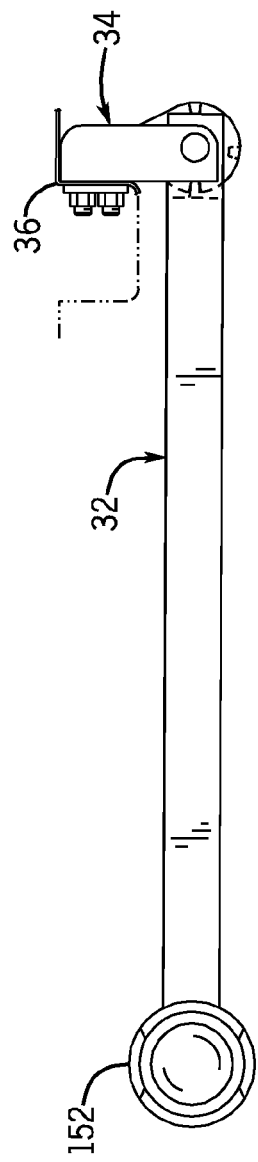
FIG. 14 is a top plan view illustrating the truck bed grab bar of the present invention mounted on a support member of the bed of a pickup truck, showing a first deployed position of the handle arm relative to the mounting bracket.

Referring now to FIGS. 14 through 16 in conjunction with FIG. 5, the handle arm 32 is shown in its three different fixed positions. In each of these positions, the latch member 130 is in its latched position, with the tooth 134 of the square body 132 engaging one of the first notch 64, the second notch 66, and the third notch 68. In FIG. 14, the tooth 134 of the square body 132 is shown in engagement with the first notch 64, with the handle arm 32 being in a first deployed position relative to the mounting bracket 34. In FIG. 15, the tooth 134 of the square body 132 is shown in engagement with the second notch 66, with the handle arm 32 being in a second stored position relative to the mounting bracket 34. In FIG. 16, the tooth 134 of the square body 132 is shown in engagement with the third notch 68, with the handle arm 32 being in a third stored position relative to the mounting bracket 34.

Referring next to FIG. 17, the truck bed grab bar of the present invention is shown installed on the vertical support member 36 which is at the rear and on one side of the bed of a pickup truck 160. The handle arm 32 is shown in its first deployed position (as also shown in FIG. 14), extending above the left side of a tailgate 162 of the pickup truck 160. A user 164 is shown with his left hand gripping the handle grip 152 of the handle arm 32 and using it to assist him in climbing onto the tailgate 162 of the pickup truck 160. Preferably, the handle grip 152 is located in a position from a location above the rearward-most portion of the open tailgate 162 of the pickup truck 160 to a position fourteen inches in front of the rearward-most portion of the open tailgate 162 of the pickup truck 160, and more preferably the handle grip 152 is located in a position approximately eight inches in front of the rearward-most portion of the open tailgate 162 of the pickup truck 160.

Also shown in FIG. 17 is a pull out tailgate step 166 that forms no part of the truck bed grab bar of the present invention, but which may be useful in conjunction with the present invention. The pull out tailgate step 166 is described in U.S. Pat. Nos. 6,237,927 and 6,474,668, both to Debo, which patents are exclusively licensed to the assignee of the present patent application and which patents are both hereby incorporated herein by reference.

Figure 18:
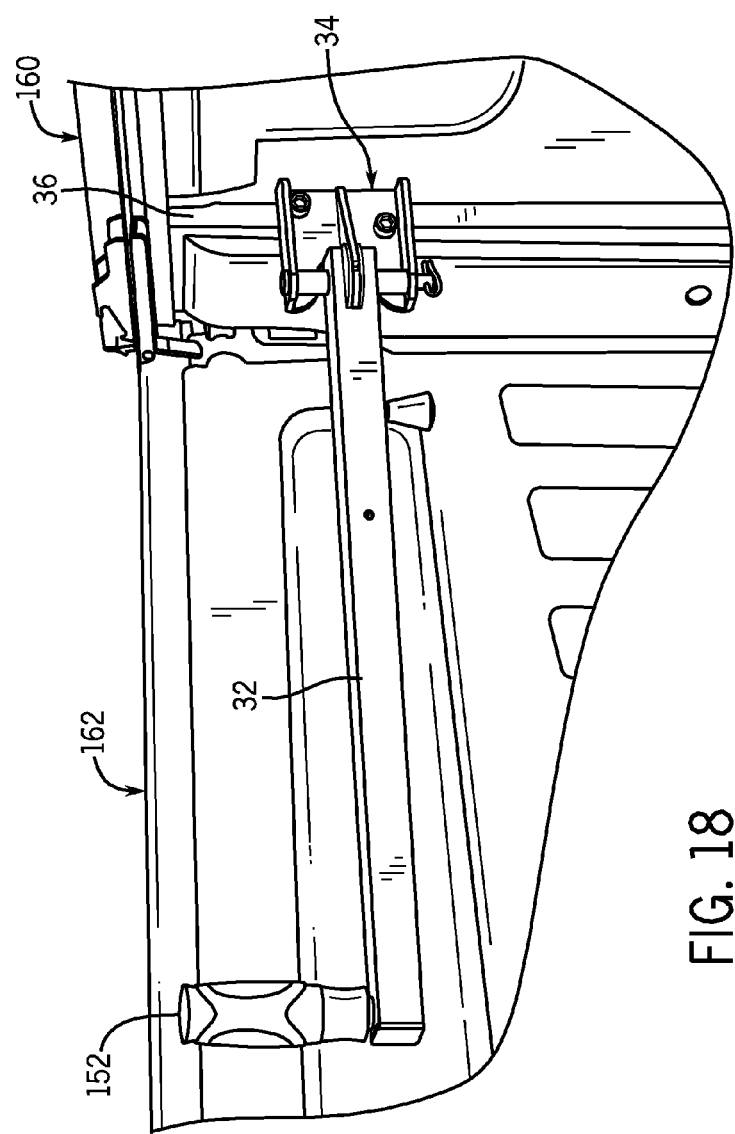
FIG. 18 is an isometric view of the truck bed grab bar of the present invention mounted in the bed of a pickup truck, showing the handle arm in the second stored position adjacent the closed tailgate of the pickup truck.

Referring now to FIG. 18, the handle arm 32 is shown in its second stored position (as also shown in FIG. 15), extending so that the distal end of the handle arm 32 including the handle grip 152 is close adjacent the inside of the tailgate 162 of the pickup truck 160, which is in its closed position. In this position, the handle arm 32 is located close to the tailgate 162 of the pickup truck 160 so that substantially the entire bed of the pickup truck 160 is available for storage. Thus, the 83 degree position from the first stored position (shown in FIG. 17) in which the handle arm 32 extends rearwardly will be understood to place the handle grip 152 close adjacent the inside of the closed tailgate 162.

Figure 19:
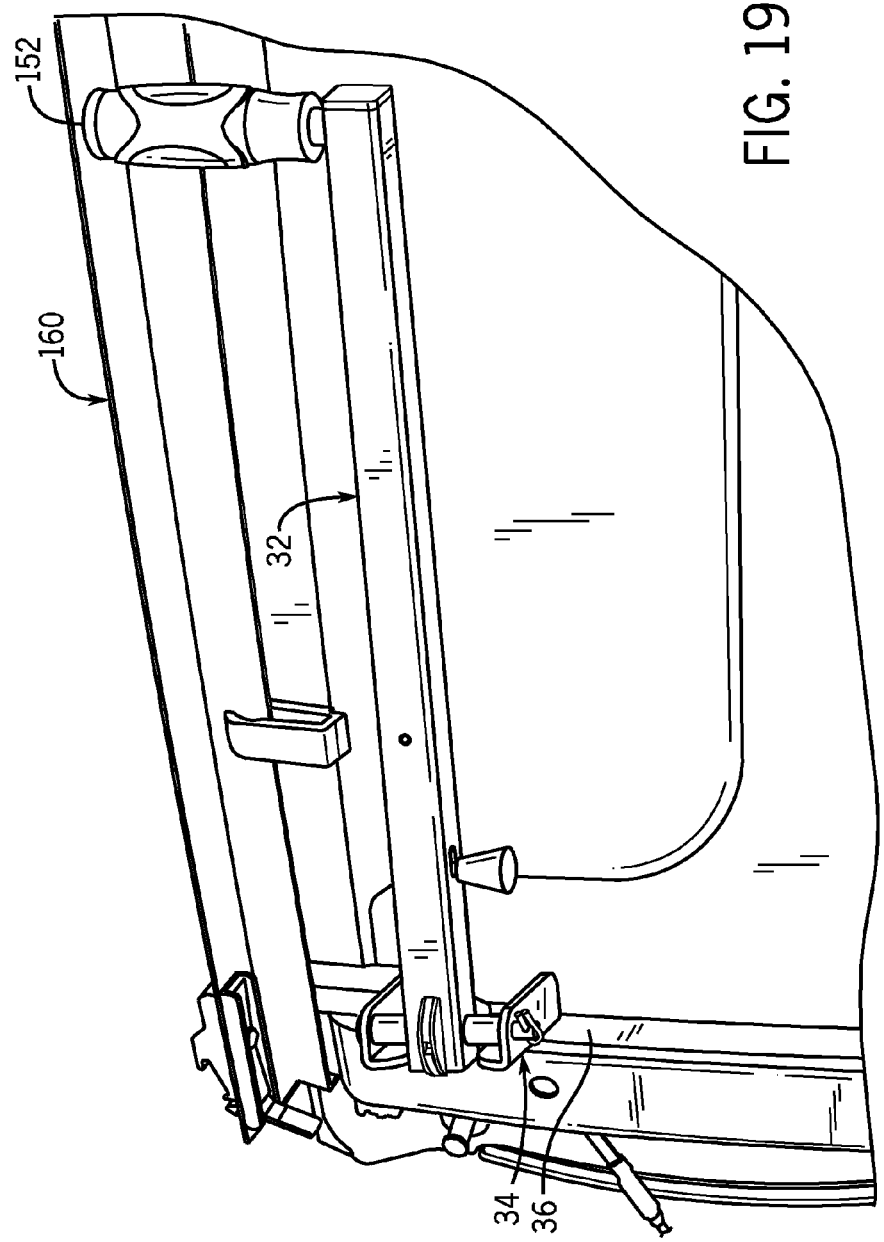
FIG. 19 is an isometric view of the truck bed grab bar of the present invention mounted in the bed of a pickup truck, showing the handle arm in the third stored position adjacent the side wall of the bed of the pickup truck.

Referring finally to FIG. 19, the handle arm is shown in its third stored position (as also shown in FIG. 16), with the handle arm 32 extending close adjacent the left side wall of the pickup truck 160. In this position, the handle arm 32 is located close to the left side wall of the pickup truck 160 so that substantially the entire bed of the pickup truck 160 is again available for storage.

It may therefore be appreciated from the above detailed description of the exemplary embodiment of the present invention that it provides a system and method to better assist a user to climb up onto the tailgate and bed of a pickup truck. The truck bed grab bar system and method of the present invention provides a grip handle in an ergonomically superior location above and near the rear end of the tailgate of the pickup truck to better assist a user to climb up onto the tailgate and bed of a pickup truck. The truck bed grab bar system and method of the present invention optionally provides a grip handle that can be stored in a plurality of positions rather than in only a single position. The truck bed grab bar system and method of the present invention provides a grip handle that may be installed on any pickup truck as an after-market product rather than requiring it to have been built into the pickup truck at the time of its manufacture. Finally, the truck bed grab bar system and method of the present invention achieve numerous advantages without incurring any substantial relative disadvantage.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. A deployable grab handle for assisting an individual to climb onto a tailgate of a pickup truck having a bed with sidewalls, the grab handle comprising:

a mounting bracket that is arranged and configured for mounting to a sidewall of the pickup truck bed near a rear end thereof;

a handle arm that is arranged and configured for pivotable mounting at a first end thereof onto the mounting bracket such that the handle arm pivots in a horizontal plane between a deployed position extending to the rear of the truck over the tailgate when the tailgate is in an open position and at least one stowed position in a space defined within the bed of the pickup truck when the tailgate is in a closed position;

a handle grip located at a second end of the handle arm opposite the first end thereof; and a latching mechanism that is arranged and configured to releasably lock the handle arm in either the deployed position or in the at least one stowed position.

2. A deployable grab handle as defined in claim 1, wherein the mounting bracket is arranged and configured for mounting to the sidewall of the pickup truck bed near a top of the sidewall on either side of the bed of the pickup truck.

3. A deployable grab handle as defined in claim 1, wherein the mounting bracket is arranged and configured for mounting to a vertical support member located in the pickup truck bed, the deployable grab handle additionally comprising:

a nut plate located on the opposite side of the vertical support member from the mounting bracket; and a plurality of connecting members extending sequentially through the mounting bracket, the vertical support member, and the nut plate.

4. A deployable grab handle as defined in claim 1, additionally comprising:

a first pivoting mechanism located on the mounting bracket; and a second pivoting mechanism located on the handle arm at the first end.

5. A deployable grab handle as defined in claim 4, wherein the first pivoting mechanism comprises:

a support bracket having parallel, spaced-apart upper and lower flanges each having apertures located therein that together define a first vertical axis; and wherein the second pivoting mechanism comprises:

a pair of apertures located in top and bottom sides of the handle arm at the first end thereof that together define a second vertical axis;

wherein the first end of handle arm is located intermediate the upper and lower flanges in the support bracket with the first and second vertical axes being coaxial, and wherein the deployable grab handle additionally comprises:

a pin extending sequentially through the aperture in the upper flange, the aperture in the top side of the handle arm, the aperture in the bottom side of the handle arm, and the aperture in the lower flange.

6. A deployable grab handle as defined in claim 5, additionally comprising:

a first hollow cylindrical boss mounted orthogonally on the top side of the handle arm at the first end thereof in axial alignment with the aperture on the top side of the handle arm at the first end thereof, the first hollow cylindrical boss being located below the upper flange; and a second hollow cylindrical boss mounted orthogonally on the bottom side of the handle arm at the first end thereof in axial alignment with the aperture on the bottom side of the handle arm at the first end thereof, the second hollow cylindrical boss being located above the lower flange;

wherein the pin extends through each of the first and second spacers.

7. A deployable grab handle as defined in claim 4, additionally comprising:
- a flat latch plate located on the mounting bracket which will be oriented in a horizontal plane when the mounting plate is mounted to a sidewall of the pickup truck bed; and
- a pair of spaced-apart, parallel, flat elements respectively located on a top side and a bottom side of a notch located in the first end of the handle arm and extending between opposite sides thereof, at least a portion of the flat latch plate being located intermediate the flat elements.

8. A deployable grab handle as defined in claim 1, wherein the handle arm is of a length such that the handle grip at the second end of the handle arm is located in a position from a location above the rearward-most portion of the open tailgate of the pickup truck to a position fourteen inches in front of the rearward-most portion of the open tailgate of the pickup truck.

9. A deployable grab handle as defined in claim 8, wherein the handle arm is of a length such that the handle grip at the second end of the handle arm is located in a position approximately eight inches in front of the rearward-most portion of the open tailgate of the pickup truck.

10. A deployable grab handle as defined in claim 1, wherein the mounting bracket is arranged and configured for mounting to a sidewall of the pickup truck bed near the top of the sidewall and near a rear end thereof.

11. A deployable grab handle as defined in claim 1, additionally comprising:
- a grip handle tube extending orthogonally from the second end of the handle arm;
wherein the handle grip is mounted on the grip handle tube.

12. A deployable grab handle as defined in claim 1, wherein the handle arm is arranged and configured for pivotable mounting onto the mounting bracket such that the handle arm pivots in a horizontal plane between the deployed position, a first stowed position in which the second end of the handle arm is located close adjacent the inside of the tailgate when the tailgate is in its closed position, and a second stowed position in which the handle arm is close adjacent the sidewall of the pickup truck on which the mounting bracket is installed, and wherein the latching mechanism is arranged and configured to releasably lock the handle arm in any of the deployed position, the first stowed position, and the second stowed position.

13. A deployable grab handle as defined in claim 12, wherein when the handle arm is in the second stowed position it is angularly displaced approximately 175-180 degrees from the handle arm when it in the deployed position, and wherein when the handle arm is in the first stowed position it is angularly displaced approximately 83 degrees from the handle arm when it in the deployed position.

14. A deployable grab handle as defined in claim 1, wherein the handle arm is hollow, and wherein the latching mechanism comprises:
- a first latch member mounted on the mounting bracket, the first latch member having a circular segment with a plurality of notches located therein;
- a notch located in the first end of the handle arm and extending between opposite sides thereof, at least a portion of the circular segment of the first latch member being received within the notch in the handle arm; and
- a latch member located within the handle arm and having a latched position in which the latch member engages any of the notches in the circular segment that are rotationally aligned with the latch member and an unlatched position in which the latch member is retracted away from the circular segment.

15. A deployable grab handle as defined in claim 14, additionally comprising:
- a spring located within the handle arm for urging the latch member to its latched position; and
- a knob accessible outside the handle arm for operating the latch member to move it to its unlatched position to allow the handle arm to be moved between the deployed position, the first stowed position, and the second stowed position.

16. A deployable grab handle for assisting an individual to climb onto a tailgate of a pickup truck having a bed with sidewalls, the grab handle comprising:
- a mounting bracket that is arranged and configured for mounting to one of the sidewalls of the pickup truck bed near a rear end thereof;
- a latch plate located on the mounting bracket, the latch plate having first, second, and third notches located therein;
- a handle arm that is arranged and configured for pivotable mounting at a first end thereof onto the mounting bracket such that the handle arm pivots in a horizontal plane between a first deployed position extending to the rear of the truck over the tailgate when the tailgate is in an open position, a second stored position in which the second end of the handle arm is located close adjacent the inside of the tailgate when the tailgate is in its closed position, and a third stowed position in which handle arm is close adjacent the sidewall of the pickup truck on which the mounting bracket is installed;
- a handle grip located at a second end of the handle arm opposite the first end thereof; and
- a latch member located in the handle arm and moveable between latched and unlatched positions, the latch member being arranged and configured for latching engagement with any of the first, second, or third notches in the latch plate;

wherein the latch member releasably locks the handle arm in the first deployed position when it engages the first notch in the latch plate; and
wherein the latch member releasably locks the handle arm in the second stored position when it engages the second notch in the latch plate; and
wherein the latch member releasably locks the handle arm in the third stored position when it engages the third notch in the latch plate.

17. A method of facilitating an individual to climb onto a tailgate of a pickup truck having a bed with sidewalls, the method comprising:
- providing a mounting bracket that is arranged and configured for mounting to a sidewall of the pickup truck bed near a rear end thereof;
- mounting a handle arm at a first end thereof onto the mounting bracket for pivotable movement in a horizontal plane between a deployed position extending to the rear of the truck over the tailgate and at least one stowed position within the bed of the pickup truck, the handle arm having a handle grip located at a second end thereof opposite the first end thereof; and
- releasably locking the handle arm in either the deployed position or in the at least one stowed position.

18. A method as defined in claim 17, wherein the handle arm is mounted for pivotable movement between the deployed position extending to the rear of the truck over the tailgate, a first stowed position in which the second end of the handle arm is located close adjacent the inside of the tailgate when the tailgate is in its closed position, and a second stowed position in which the handle arm is close adjacent the sidewall of the pickup truck on which the mounting bracket is installed, and wherein the handle arm may be releasably locked in any of the deployed position, the first stowed position, and the second stowed position.

19. A method as defined in claim 17, wherein when the handle arm is in the second stowed position it is angularly displaced approximately 175-180 degrees from the handle arm when it is in the deployed position, and wherein when the handle arm is in the first stowed position it is angularly displaced less than 90 degrees from the handle arm when it is in the deployed position.

* * * * *